(12) United States Patent
Newman

(10) Patent No.: US 11,914,905 B1
(45) Date of Patent: Feb. 27, 2024

(54) MEMORY SELF-REFRESH RE-ENTRY STATE

(71) Applicant: XILINX, INC., San Jose, CA (US)

(72) Inventor: Martin Newman, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 35 days.

(21) Appl. No.: 17/377,016

(22) Filed: Jul. 15, 2021

(51) Int. Cl.
*G06F 3/06* (2006.01)
*G06F 13/16* (2006.01)

(52) U.S. Cl.
CPC ........ *G06F 3/0673* (2013.01); *G06F 13/1668* (2013.01)

(58) Field of Classification Search
CPC .......................... G06F 3/0673; G06F 13/1668
See application file for complete search history.

(56) References Cited

U.S. PATENT DOCUMENTS

| | | | | |
|---|---|---|---|---|
| 9,299,415 | B1 * | 3/2016 | Asbury | G11C 11/4076 |
| 2007/0157046 | A1 * | 7/2007 | Samson | G11C 11/40615 |
| | | | | 713/323 |
| 2008/0170456 | A1 * | 7/2008 | Yang | G06F 13/1636 |
| | | | | 365/222 |
| 2011/0225465 | A1 * | 9/2011 | Blackmon | G11C 11/406 |
| | | | | 711/E12.001 |
| 2012/0155201 | A1 * | 6/2012 | Schreck | G11C 11/406 |
| | | | | 365/194 |
| 2014/0149759 | A1 * | 5/2014 | Conrad | G06F 1/3228 |
| | | | | 713/320 |
| 2015/0206574 | A1 * | 7/2015 | Greathouse | G11C 14/0018 |
| | | | | 711/103 |
| 2017/0069371 | A1 * | 3/2017 | Shin | G11C 11/40615 |
| 2018/0061484 | A1 * | 3/2018 | Biswas | G06F 3/0659 |
| 2019/0043557 | A1 * | 2/2019 | Cox | G11C 7/1057 |
| 2022/0066700 | A1 * | 3/2022 | Kim | G11C 11/40615 |

* cited by examiner

*Primary Examiner* — Zhuo H Li
(74) *Attorney, Agent, or Firm* — Patterson + Sheridan, LLP

(57) ABSTRACT

Examples describe memory refresh operations for memory subsystems. One example is a method for a memory controller, the method including entering a first state upon exiting self-refresh state, wherein the first state comprises activating a first timer. The method includes entering a second state from the first state upon detecting an end of an active period and detecting that the first timer has not expired. The method includes entering a third state from the second state upon detecting expiration of the second state, wherein the third state comprises re-entering the self-refresh state.

20 Claims, 7 Drawing Sheets

MEMORY SELF-REFRESH RE-ENTRY STATE

TECHNICAL FIELD

Examples of the present disclosure generally relate to memory subsystems and, in particular, to adapting memory self-refresh operations to memory access traffic patterns.

BACKGROUND

In some applications, system processing may result in uneven levels of memory access to attached memory subsystems. As such, memory subsystems can reduce average power consumption by entering low power states during blocks of lower memory activity. However, some memory, such as high bandwidth memory (HBM) and other types of double data rate (DDR) memories, require refresh operations in order to maintain the memory contents intact. The memory controller can issue memory refresh operations to the memory as a background maintenance process, but these memory refresh operations increase power consumption. To further optimize power savings during these idle periods, some memory types support an internal Self-Refresh state, during which the memory refreshes itself. This state allows most logic in the memory system to be disabled to provide greater power savings during idle periods.

The overall power savings may be evaluated based on impact on memory performance. There are timing delay costs for both entering the internal self-refresh state (SRE) and exiting the internal self-refresh state (SRX). A memory controller may utilize an idle timeout mechanism to predict when a long period of no activity is occurring. This timeout window, DO, may be much longer than the overhead penalty for SRE and SRX transitions.

For some applications, the memory controller can experience patterns of memory access bursts. These patterns of memory access bursts involve one or more small bursts of memory activity followed by longer intervals of no memory activity. One such source of these sparse memory access bursts are sequential background scrubbing read operations, which are meant to detect and fix any internal memory errors before errors can accumulate beyond repair.

Because of these patterns of sparse memory access bursts, the adaptive self-refresh entry and exit mechanisms lose efficiency when trying to follow patterns of sparse memory access bursts with a single idle timeout value.

SUMMARY

These and other examples may be understood with reference to the following detailed description. One example is a method for a memory controller, the method including entering a first state upon exiting self-refresh state, wherein the first state comprises activating a first timer. The method includes entering a second state from the first state upon detecting an end of an active period and detecting that the first timer has not expired. The method includes entering a third state from the second state upon detecting expiration of the second state, wherein the third state comprise re-entering the self-refresh state.

In another example of a method for a memory controller, the method includes activating a timer upon completing a first self-refresh process. The method includes activating a counter upon detecting the end of an active period and the first timer is below a first threshold. The method includes initiating a second self-refresh process upon determining the counter has exceeded a second threshold and the timer has exceeded the first threshold.

In another example, an apparatus is provided, the apparatus including memory and a memory controller. The memory controller is configured to activate a first timer upon completing a first self-refresh process. The memory controller is configured to activate a second timer upon detecting the end of an active period and the first timer is below a first threshold. The memory controller is configured to initiate a second self-refresh process upon determining the second timer has exceeded a second threshold and the first timer has exceeded the first threshold.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
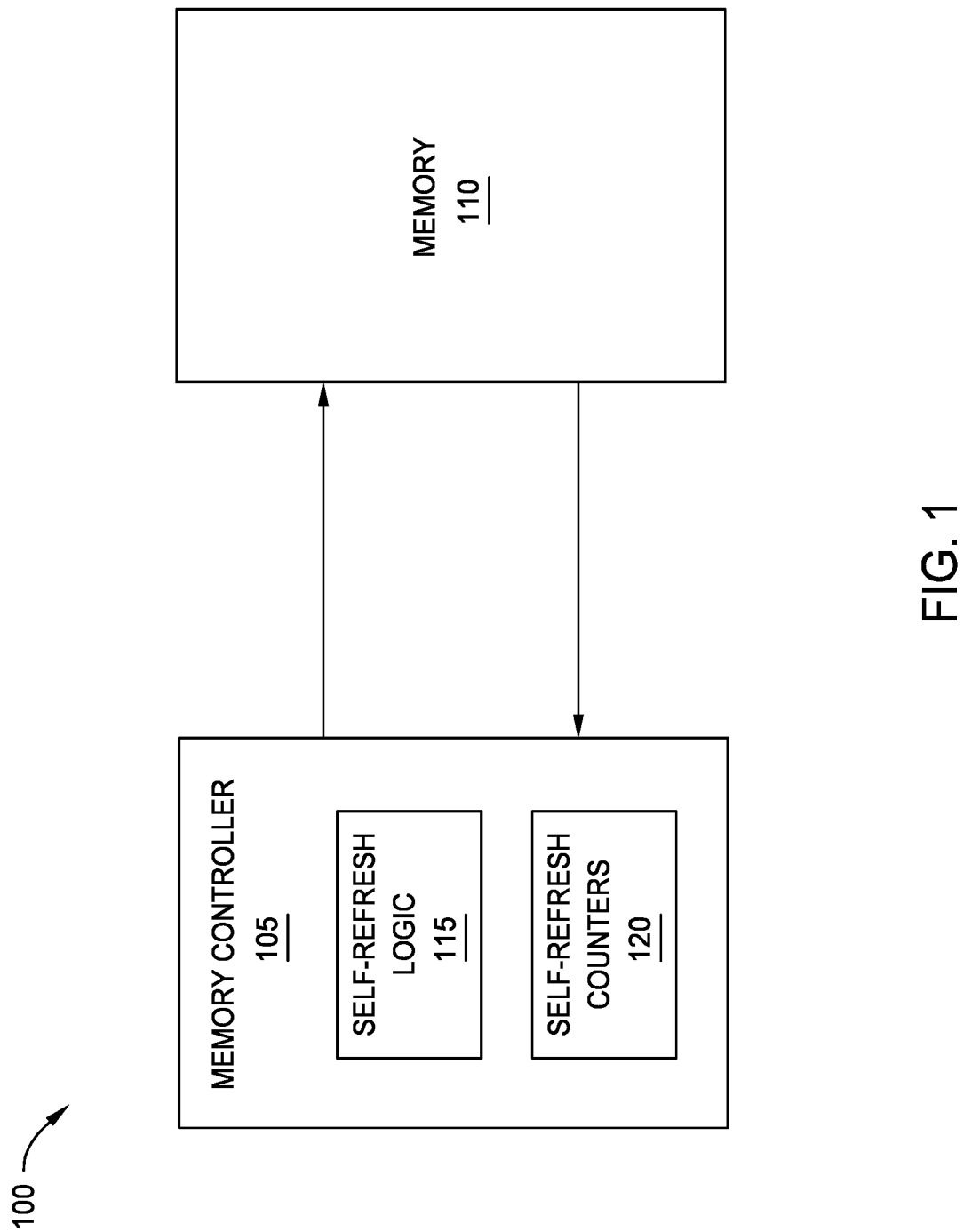
FIG. 1 illustrates an example memory controller coupled to memory, according to one example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples disclosed herein provide techniques for adapting memory self-refresh operations to memory access traffic patterns. Some memory systems define an idle time period that causes the memory system to enter a low power state (e.g., self-refresh) in order to save power during sustained periods of no memory operations. Examples disclosed herein describe two separate idle timeout interval requirements to initiate entry into the self-refresh state: one during a defined window following an exit out of the self-refresh state, and a second applying to all other operating periods. In some examples, the memory controller performs memory self-refresh operations, which involve activating a timer upon the end of a first self-refresh operation, activating a counter upon detecting the end of an active period of memory transactions and the timer has not expired, and initiating a second self-refresh operation.

In one example, the memory self-refresh operations includes an HQ timer and two idle timeout thresholds: D0 and DQ. The memory controller uses the D0 idle timeout threshold to predict when a long period of no memory activity occurs, so the maximum period of the D0 idle timeout threshold is much longer than the DQ idle timeout threshold and the HQ timer to minimize premature entry into self-refresh state. Also, the D0 idle timeout threshold is longer than the overhead penalty for entry to and exit from self-refresh state. The memory controller uses the DQ idle timeout threshold and the HQ timer to better optimize power savings versus efficiency in the presence of bursts of active periods. In some examples, following exit from self-refresh state, the memory controller uses the DQ idle timeout threshold to initiate entry into self-refresh state for a period equal to the maximum period of the HQ timer. If the HQ timer expires before entry into self-refresh state occurs, then the memory controller reverts back to using the D0 idle timeout threshold. The DQ idle timeout threshold is smaller than the maximum period for the D0 idle timeout threshold because the probability of renewing a sustained idle period is higher with bursts of active periods of memory transactions.

Accordingly, the memory self-refresh operations disclosed herein allow for more optimal power savings and efficiency in the presence of bursts of short active periods of memory transactions. Compared to using only the D0 idle timeout threshold, the memory self-refresh operations using the DQ idle timeout threshold and the HQ timer allow for a higher percentage of time in the self-refresh state, while minimizing the number of premature entries into self-refresh state.

FIG. 1 illustrates an example memory system, according to one example. As illustrated in FIG. 1, a memory system 100 includes a memory controller 105 and memory 110. The memory system 100 may be included in processing systems, including a central processing unit or field programmable gate arrays (FPGA).

The memory controller 105 includes self-refresh logic 115 and self-refresh counters 120. The memory controller 105 uses the self-refresh logic 115 and self-refresh counters 120 to perform self-refresh operations on the memory 110. The self-refresh logic 115 and the self-refresh counters 120 in the memory controller 105 may be used with the self-refresh operations used to address bursts of memory access.

The memory 110 is a computer-readable medium coupled to the memory controller 105. The memory 110 can be high-bandwidth memory (HBM), double data rate (DDR) memory, or other memory types that require periodically refreshing of the contents of the memory 110. The memory 110 operates in concert with the memory controller 105.

Figure 2:
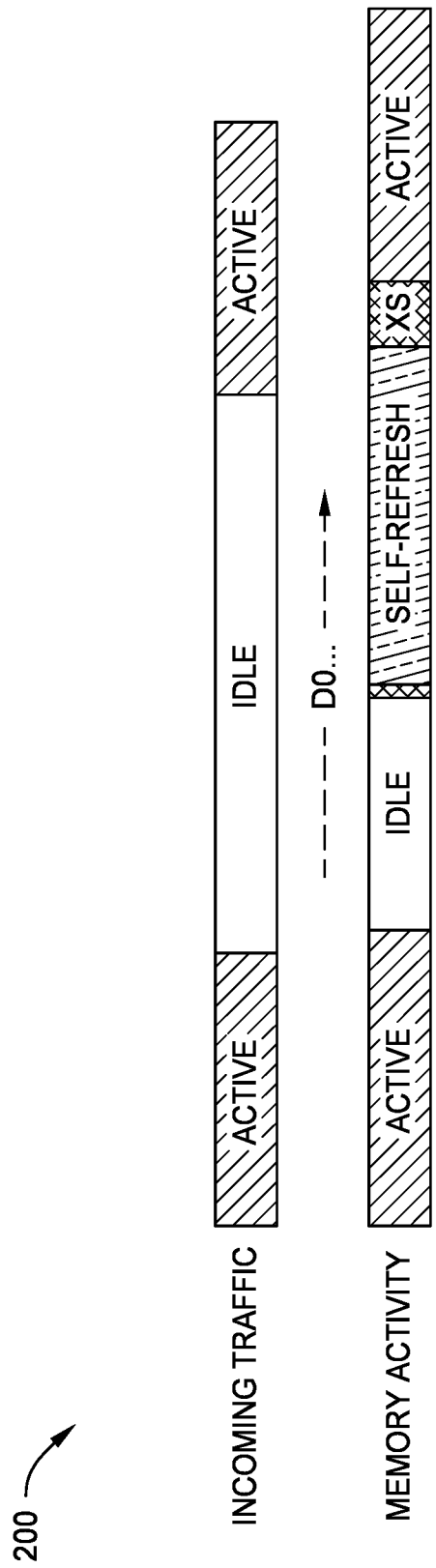
FIG. 2 illustrates example memory transactions and corresponding memory activity by a memory controller.

FIG. 2 illustrates example memory traffic and memory activity by a memory controller (e.g., memory controller 105 of FIG. 1), according to one example. The memory traffic includes memory transactions sent to the memory controller 105 from outside the memory system 100 or from the memory 110. The memory activity illustrated in FIG. 2 corresponds to the incoming memory transactions and are delayed in time compared to the incoming memory traffic due to the time the memory controller 105 needs to receive and process the incoming memory traffic.

As illustrated in FIG. 2, the memory controller 105 receives memory transactions during an active period of incoming memory traffic, then receives no memory transaction during an idle period, then receives memory transactions during another active period of incoming memory traffic. Accordingly, the memory controller 105 issues instructions during active periods corresponding to the active periods of incoming memory traffic, and the memory controller 105 has an idle period and self-refresh periods. The idle periods and the self-refresh periods corresponds to the idle periods of incoming memory traffic. In some examples, between active periods of memory activity by the memory controller 105, the memory controller 105 can perform other processes, such as preparing for self-refresh and for the delay required after exiting the self-refresh state before any commands can be issued, during an idle period of memory activity.

The memory activity of FIG. 2 illustrates operations by the memory controller when reacting to incoming memory traffic that have longer periods of memory activity. The memory controller 105 uses an idle cycle counter that begins upon detecting the end of an active period and enters self-refresh state when the idle cycle counter meets or exceeds the D0 idle timeout threshold. Once the memory controller 105 detects incoming memory traffic, the memory controller 105 exits self-refresh state and processes the incoming memory traffic during an active period of memory activity.

However, in some scenarios based on short bursts of memory transactions, a single D0 idle timeout threshold can be less accurate in predicting idle periods and will be less efficient in terms of power consumption.

Figure 3:
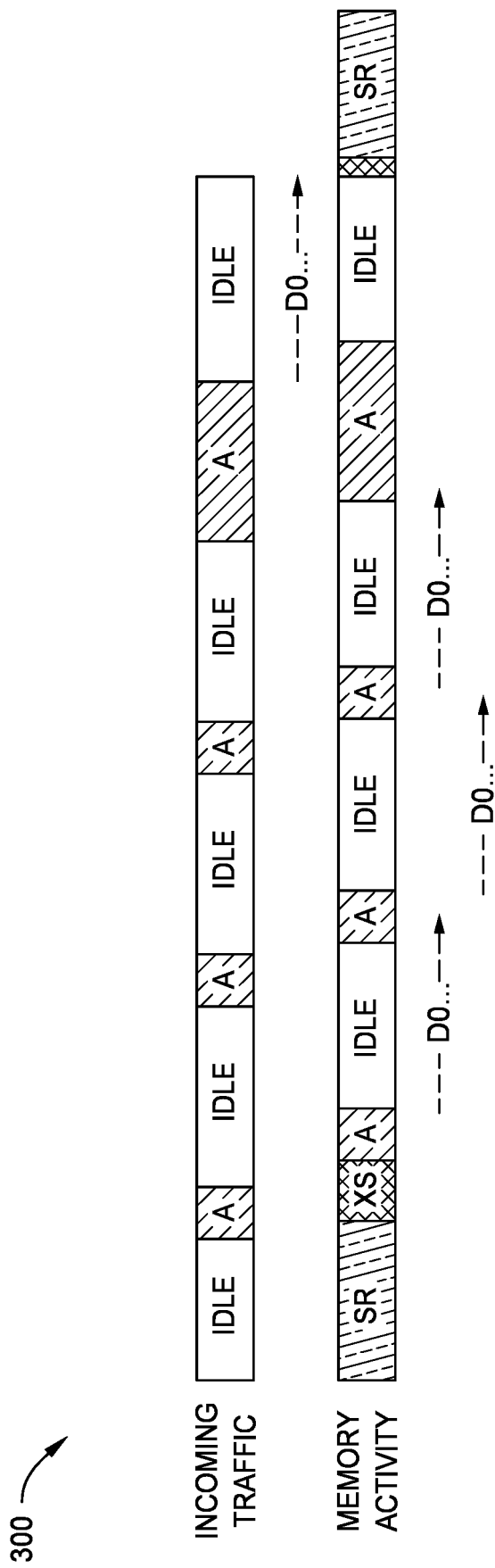
FIG. 3 illustrates example memory transactions and corresponding memory activity by a memory controller.

FIG. 3 illustrates bursts of memory traffic and corresponding memory activity by the memory controller 105, according to one example. Like with the memory traffic and corresponding memory activity illustrated in FIG. 2, the memory controller 105 receives incoming memory traffic with idle periods and active periods. However, instead of the relatively longer active periods in FIG. 2, FIG. 3 illustrates short active periods of memory activity.

The active periods in FIG. 3 are relatively short bursts of memory activity handled by the memory controller 105, and may not last long enough for the idle cycle counter to meet or exceed the D0 idle timeout threshold. For example, the idle cycle counter starts from the end of each active period of memory activity and counts the number of cycles during which there is no memory activity, but another active period may begin before the idle cycle counter equals or exceeds the D0 idle timeout threshold. This situation may occur with bursts of active memory traffic where the idle periods between bursts of active memory traffic are smaller than the number of idle cycles indicated by the D0 idle timeout threshold. Because the idle cycle counter did not reach or exceed the D0 idle timeout threshold before the bursts of active memory traffic, the memory controller 105 does not initiate any self-refresh operations. Accordingly, what is needed is a technique to address bursts of incoming memory traffic.

Figure 4A:
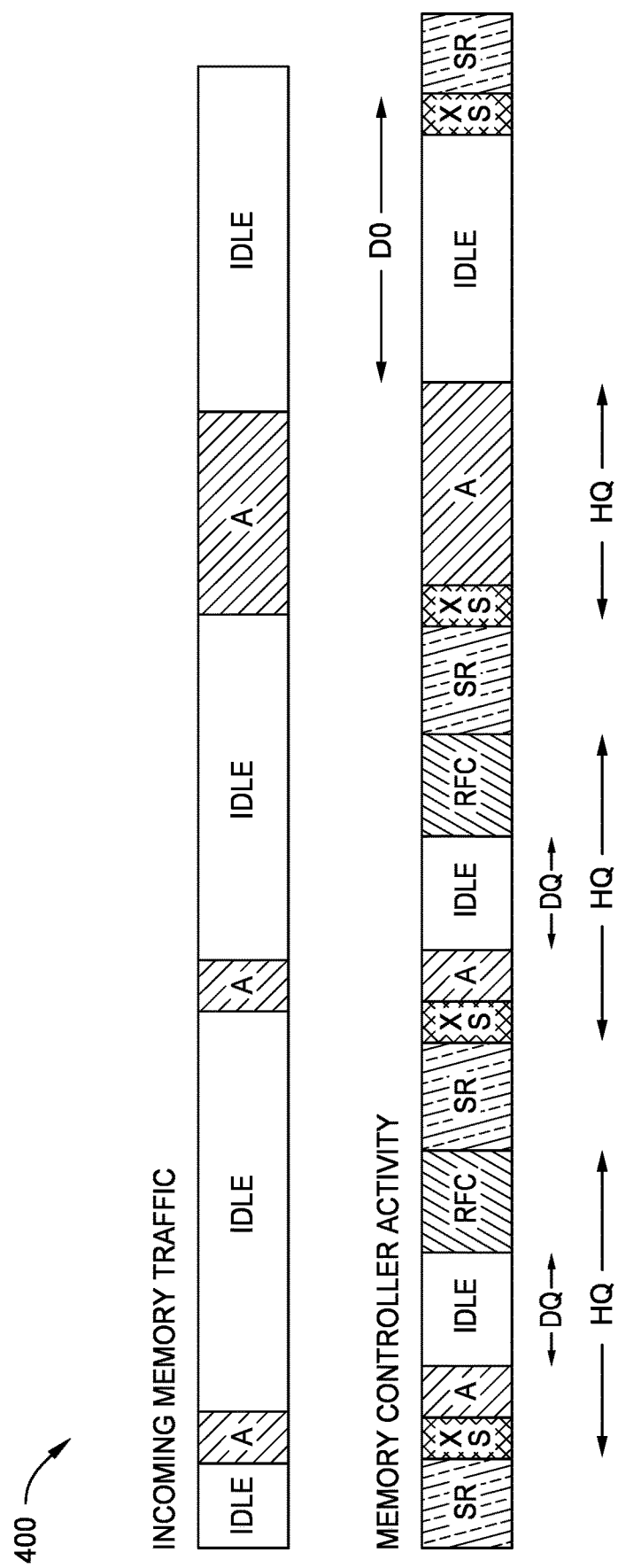
FIGS. 4A and 4B illustrate example memory transactions and corresponding memory activity by a memory controller, according to one example.
Figure 4B:
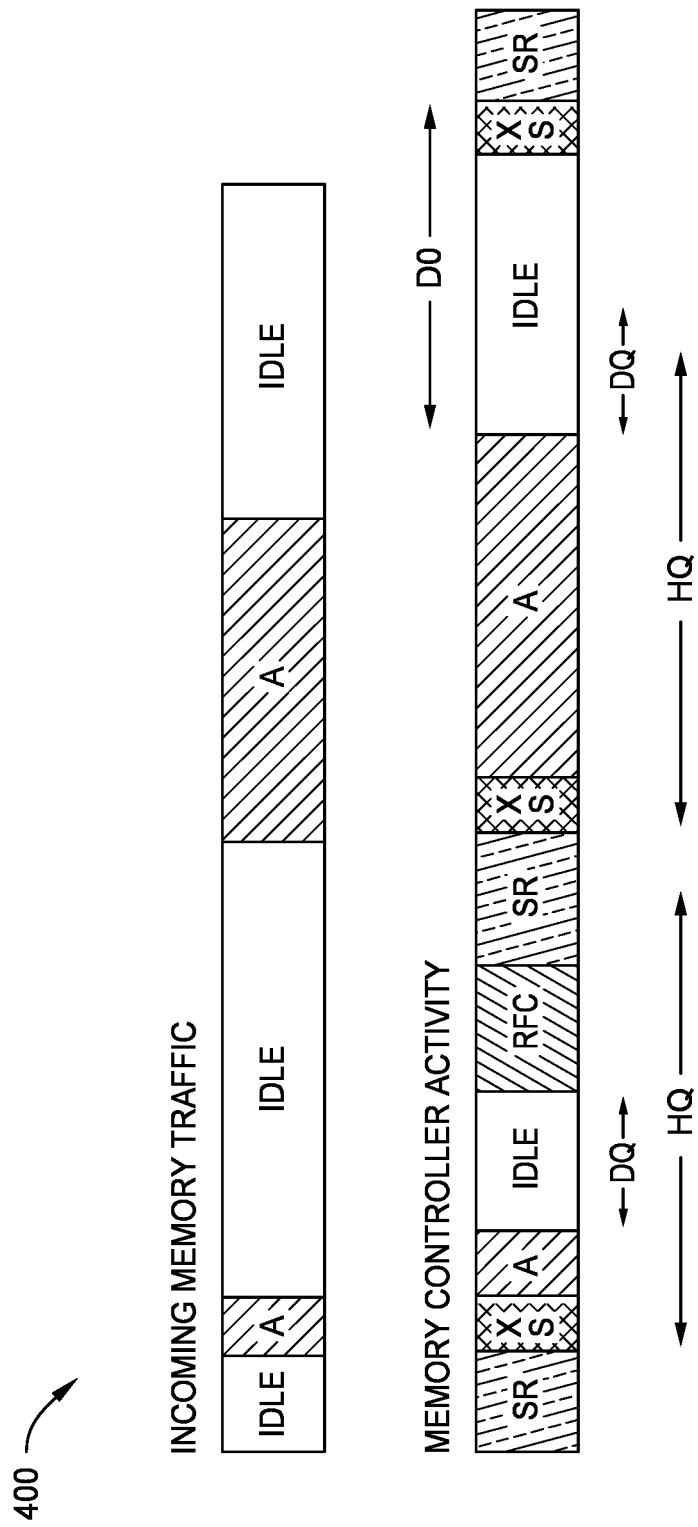

FIGS. 4A and 4B illustrate timers used for bursts of memory traffic and corresponding memory activity by the memory controller 105, according to one example. As mentioned previously, the memory controller 105 includes self-refresh logic 115 and self-refresh counters 120, including an HQ timer and an idle cycle counter with D0 and DQ idle timeout thresholds. These timers and thresholds increase power savings and efficiency in the presence of the relatively short bursts of incoming memory traffic. The timers and thresholds may be predefined or configured by the memory controller 105 prior to operation.

As illustrated in both FIGS. 4A and 4B, the HQ timer starts when the self-refresh state ends and tracks the time interval from when the self-refresh state ends. The HQ timer indicates the maximum period during which the memory controller 105 can enter self-refresh state. The HQ timer may be a countdown timer, with the initial value of the HQ timer being the maximum period in which the memory controller 105 to re-enter self-refresh state, or the HQ timer may be an timer that counts up to the maximum period between two instances of self-refresh state. While the HQ timer is activated, the memory controller 105 processes incoming memory traffic, resulting in an active period of memory activity, as illustrated in FIGS. 4A and 4B. In some examples, the memory controller 105 may process any amount of incoming memory traffic.

The idle cycle counter starts when the active period of memory activity by the memory controller 105 ends. The idle cycle counter threshold counts up to the DQ idle timeout threshold, which is similar to the D0 idle timeout threshold but with a separate independent interval value. Like with the D0 idle timeout threshold, the idle cycle counter starts from the end of each active period of memory activity and counts the number of cycles during which there is no memory activity and when the idle cycle counter reaches or exceeds the DQ idle timeout threshold, the memory controller 105 issues instructions to enter into self-refresh state. In some examples, the value of the DQ idle timeout threshold is smaller than the value of the D0 idle timeout threshold. Because the DQ idle timeout threshold is smaller than the D0 idle timeout threshold, the memory controller 105 enters and exits self-refresh state more often using the DQ idle timeout threshold. In some examples, the memory controller 105 enters and exists in self-refresh state in each idle period after a short burst of memory activity. The short bursts of incoming memory traffic and corresponding memory activity increase the probability of a sustained idle period. Accordingly, the memory controller 105 uses the DQ idle timeout threshold and HQ timer to enter and exit self-refresh state based on the bursts of incoming memory and corresponding memory activity in order to increase power savings and efficiency.

As illustrated in FIGS. 4A and 4B, the HQ timer begins when the memory controller detects incoming memory traffic. After exiting a self-refresh, the memory controller 105 can anticipate receiving incoming traffic of memory transactions. In some examples, the memory controller 105 waits for a required delay after exiting the self-refresh state before any commands can be issued and before an active period of memory traffic. While the memory controller 105 processes memory transactions corresponding to incoming memory traffic during the active period, the memory controller 105 continues to increment the HQ timer. In examples where the HQ timer is a countdown timer, the memory controller 105 decrements the HQ timer from the HQ timer's maximum period.

After the active period ends, the idle cycle counter begins to count to the DQ idle timeout threshold, and both the HQ timer and the idle cycle counter increment during the idle period of the memory controller activity after the active period of the memory controller activity. In some examples, the idle cycle counter begins to count to the DQ idle timeout threshold if the active period finishes before the HQ timer expires or exceeds its requisite threshold. The requisite threshold for the HQ timer may be a maximum period for the HQ timer.

In some examples, as illustrated in FIG. 4A, the idle cycle counter reaches or exceeds the DQ idle timeout threshold while the HQ timer has not expired or exceeded its own requisite threshold. Accordingly, the memory controller 105 enters another self-refresh process, which includes the refresh command period (RFC) time period. The RFC time period is the delay after a global refresh before any command can be issued (e.g., the maximum delay for entering self-refresh state In some examples, as illustrated in FIG. 4B, the memory controller 105 can enter self-refresh state even when the HQ timer has not expired or exceeded its threshold. Upon entering another self-refresh process, the memory controller 105 can reset the HQ timers and the idle cycle counter, so that upon exiting the self-refresh process, the memory controller 105 can repeat the use of HQ timers and the idle cycle counter.

However, in some examples, as illustrated in FIG. 4A, the HQ timer may expire or exceed its requisite threshold before the active period of memory activity is complete. In such examples, the memory controller uses the D0 idle timeout threshold instead of the DQ idle timeout threshold for determining whether to and when to initiate a self-refresh process.

In some examples, as illustrates in FIG. 4B, the HQ timer expires or exceeds a requisite threshold before the idle cycle counter reaches or exceeds the DQ idle timeout threshold. Accordingly, the memory controller 105 switches from using the DQ idle timeout threshold to using the D0 idle timeout threshold upon detecting that the HQ timer has expired and the idle cycle counter has not reached or exceeded the DQ idle timeout threshold. Once the idle cycle counter reaches or exceeds the D0 idle timeout threshold, the memory controller 105 initiates a self-refresh process.

Thus, the use of HQ timers and the idle cycle counter with the DQ idle timeout threshold allows for a power savings and efficiency combination in the presence of sparsely occurring short memory access patterns because the memory controller 105 resides in self-refresh state a higher percentage of time in presence of sparse traffic.

Figure 5:
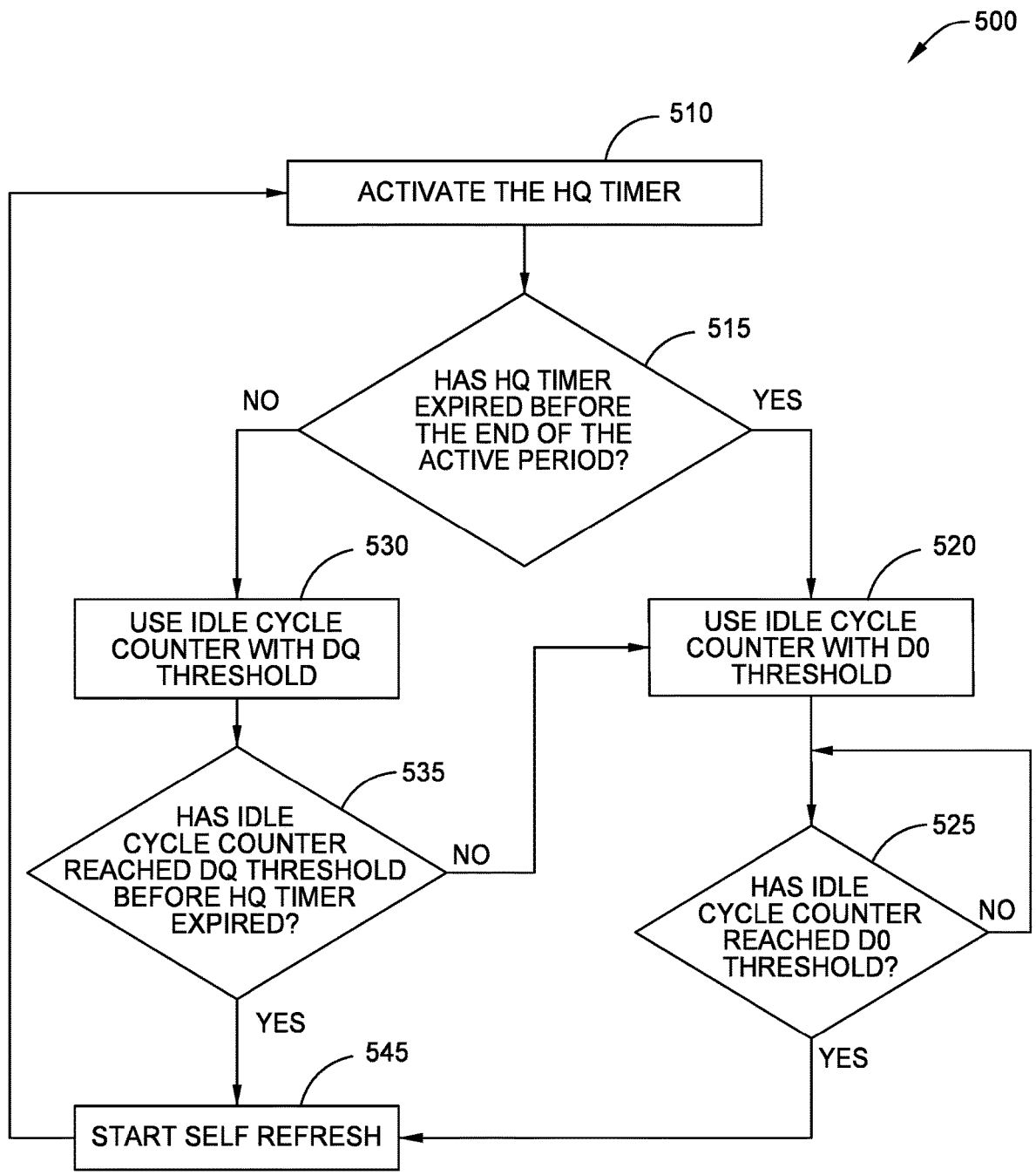
FIG. 5 is a flow diagram of example operations by a memory controller, according to one example.

FIG. 5 illustrates a flow diagram of example operations by a memory controller, according to one example. Operations 500 may be formed by a memory controller, like the memory controller 105 of FIG. 1, which coupled to memory, like memory 110 of FIG. 1. Specifically, the operations 500 may be performed by the self-refresh logic 115 of the memory controller 105.

Operations 500 begins at block 505 with the memory controller 105 activating the HQ timer upon exiting self-refresh state. The memory controller 105 may already be in self-refresh state when operations 500 begins, and activates the HQ timer upon exiting self-refresh state.

At block 515, operations 500 continues with the memory controller 105 determining whether the HQ timer has expired or whether the HQ timer has reached or exceeded the maximum period for the HQ timer before the end of the active period of memory activity. The active period may be a relatively short period of memory activity or a longer period of memory activity. The length of the active period depends on the amount of incoming memory traffic.

If the HQ timer is expired before the end of the active period of memory activity, then, at block 520, operation 500 continues with the memory controller 105 using the D0 idle timeout threshold for an idle cycle counter and the memory controller uses the idle cycle counter for counting the number of cycles during which the memory controller experiences no memory activity. The fact that the HQ timer is complete at the end of the active period indicates to the memory controller 105 that the active period was not a relatively short burst of memory activity, but was instead a longer period of memory activity. Accordingly, the memory controller 105 uses the D0 idle timeout threshold for longer periods of memory activity.

At block 525, operations 500 continue with the memory controller 105 determining whether the idle cycle counter has reached or exceeded the D0 idle timeout threshold. If the idle cycle counter has not reached the D0 idle timeout threshold, the memory controller 105 continues to monitor for lack of memory activity and continues to update the idle cycle counter until the idle cycle counter reaches the D0 idle timeout threshold. If the idle cycle counter has reached the D0 idle timeout threshold, the memory controller enters self-refresh state at block 545.

However, if the HQ timer has not expired before the end of the active period of memory activity, then, at block 530, operations 500 continue with the memory controller 105 using the DQ idle timeout threshold for an idle cycle counter and the memory controller uses the idle cycle counter for counting the number of cycles during which the memory controller experiences no memory activity after detecting an end of an active period of memory activity.

At block 535, operations 500 continue with the memory controller 105 determining whether the idle cycle counter has reached or exceeded the DQ idle timeout threshold has expired before the memory controller 105 detects incoming memory traffic (e.g., the beginning of another activity period) or before the HQ timer has expired. In some examples, the memory controller 105 determines whether the idle cycle counter has reached or exceeded the DQ idle timeout threshold before the memory controller 105 detects incoming memory traffic or before the HQ timer has expired. If the idle cycle counter has not reached or exceeded the DQ idle timeout threshold, the memory controller 105 continues to monitor for lack of memory activity and continues to update the idle cycle counter until the idle cycle counter reaches or exceeds the DQ idle timeout threshold before detecting incoming memory traffic or before the HQ timer has expired.

Upon determining the idle cycle counter has reached or exceeded the DQ idle timeout threshold before the HQ timer has expired, at block 545, operations 500 continue with the memory controller 105 entering self-refresh state. In some examples, as illustrated in FIG. 4B, the memory controller 105 may begin entering self-refresh state and may be in self-refresh state before the HQ timer has expired.

However, if the HQ timer expires before the idle cycle counter reaches or exceeds the DQ idle timeout threshold, the memory controller 105 may use the D0 idle timeout threshold for the idle cycle counter (block 520) and can enter self-refresh state when the D0 idle timeout threshold is complete (block 525).

At the end of self-refresh state, whether the memory controller 105 entered self-refresh state at block 525 or at block 535, operations 500 continues with the memory controller activating the HQ timer upon exiting self-refresh state at block 505.

Figure 6:
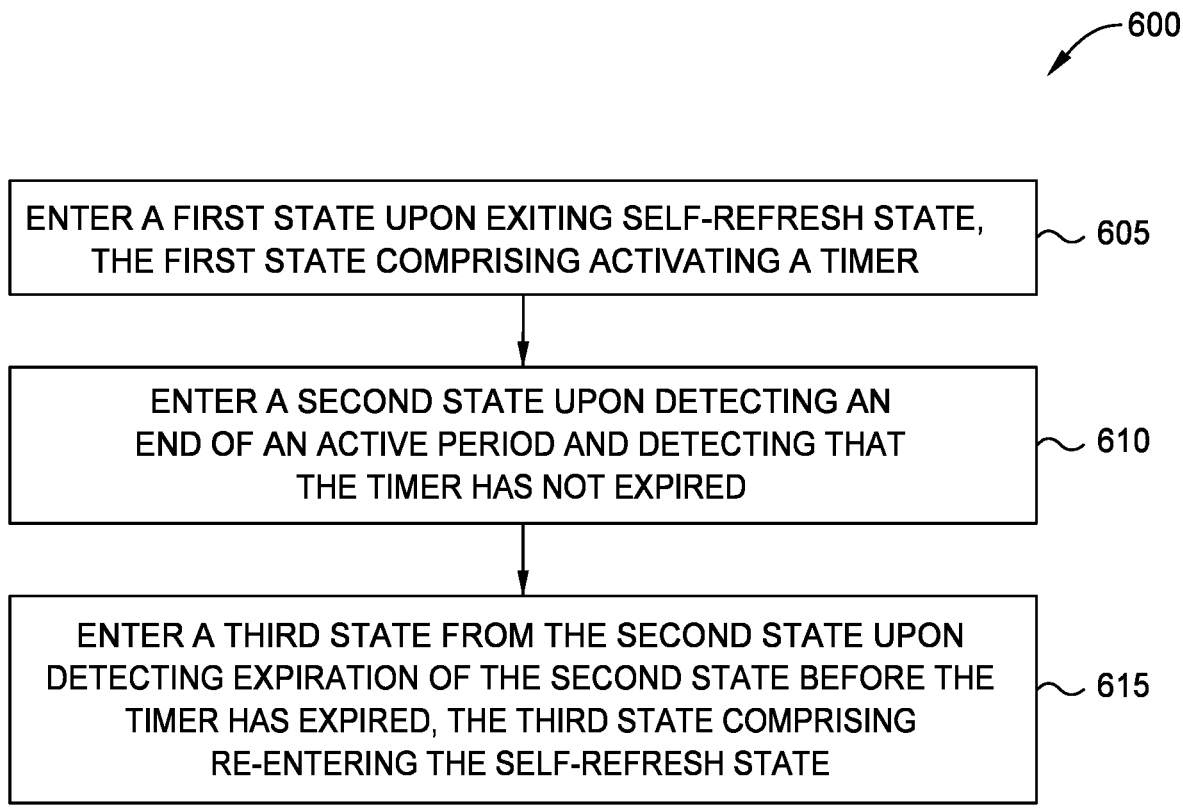
FIG. 6 is a flow diagram of example operations by a memory controller, according to one example.

FIG. 6 is a flow diagram showing example operations by a memory controller, according to one example.

Operations 600 begin at block 605 with the memory controller entering a first state upon exiting a self-refresh state. The first state involves activating a timer. In some examples, the first state includes determining a time period (e.g., using the HQ timer) since exiting the self-refresh state and comparing the time period against a maximum time period (e.g., the maximum threshold for the HQ timer) for the first state.

At block 610, operations 600 continue with the memory controller 105 entering a second state from the first state upon detecting an end of an active period and detecting that the timer has not expired. In some examples, the second state include determining a time period (e.g., using the idle cycle counter) since the end of the active period and comparing the time period against a threshold time period (e.g., the DQ idle timeout threshold) for the second state.

In some examples, the memory controller can enter the fourth state from the first state, instead of entering the second state. The fourth state can involve determining a time period (e.g., using the idle cycle counter) since the end of the active period and comparing the time period against a threshold time period (e.g., the D0 idle timeout threshold) for the fourth state for re-entering the self-refresh state. In some examples, the memory controller can also enter the fourth state from the second state.

At block 615, operations 600 continue with the memory controller 105 entering a third state from the second state upon detecting expiration of the second state before the timer has expired. The third state involves re-entering the self-refresh state. In some examples, the self-refresh state includes a period for delays during which the memory controller is configured to not perform operations or issue commands. The memory controller can include these delays directly before re-entering the self-refresh state or directly after exiting the self-refresh state. In some examples, upon exiting the self-refresh state, the memory controller resets the timer.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to specific examples, other and further examples may be devised without departing from the basic scope thereof, and the scope thereof is determined by the claims that follow.

What is claimed is:

1. A method for a memory controller, comprising:
   entering a first state upon exiting a self-refresh state, wherein the first state comprises activating a timer, wherein the timer is associated with a period for the memory controller to re-enter the self-refresh state;
   entering a second state from the first state based on detecting an end of an active period and detecting that the timer has not expired, wherein entering the second state comprises initiating a counter that counts a number of cycles lacking memory activity, and wherein memory transactions are processed during the active period and not processed during an idle period of the second state; and
   entering a third state from the second state based on determining that a value of the counter has reached or exceeded an idle timeout threshold value before the timer has expired, wherein the third state comprises re-entering the self-refresh state wherein the idle timeout threshold value corresponds to a length of the idle period of the second state, and wherein the timer and the counter are reset based on entering the third state.

2. The method of claim 1, wherein the first state comprises determining a time period since exiting the self-refresh state and comparing the time period against a maximum time period for the first state.

3. The method of claim 1, wherein the second state comprises determining a time period since the end of the active period and comparing the time period against a threshold time period for the second state.

4. The method of claim 1, further comprising entering a fourth state from the first state upon determining the timer has expired before the end of the active period, wherein the fourth state involve determining a time period since the end of the active period and comparing the time period against a threshold time period for the fourth state for re-entering self-refresh state.

5. The method of claim 1, wherein the self-refresh state comprises a period for delays during which the memory controller is configured to not perform operations.

6. The method of claim 1 wherein the memory controller performs a self-refresh process in the self-refresh state on at least one of high bandwidth memory (HBM) or double data rate (DDR) memory.

7. The method of claim 1, further comprising entering a fourth state from the second state upon detecting expiration of the timer before the expiration of the second state, wherein the fourth state involve determining a time period since the end of the active period and comparing the time period against a threshold time period for the fourth state for re-entering self-refresh state.

8. The method of claim 1 further comprising:
entering a fourth state from the third state based on determining that a second timer has expired before a second counter has reached or exceeded a second idle timeout threshold value and the second counter has reached or exceeded a third threshold, wherein a value of the third threshold is greater than the second idle timeout threshold value.

9. The method of claim 8 further comprising:
entering a fifth state from the third state, wherein entering the fifth state comprising activating the second timer; and
entering a sixth state from the fifth state based on detecting an end of a second active period and detecting that the second timer has not expired, wherein entering the fifth state comprises initiating the second counter that counts a number of cycles lacking memory activity, and wherein entering the fourth state from the third state comprises entering the fourth state from the sixth state based on determining that the second timer has expired before the second counter has reached or exceeded the second idle timeout threshold value and the second counter has reached or exceeded the third threshold.

10. A method for a memory controller, comprising:
activating a timer upon completing a first self-refresh process, the timer is associated with a period between self-refresh processes of the memory controller;
activating a counter upon detecting an end of an active period and the timer is below a first threshold, wherein the counter is associated with an idle period and counts a number of cycles lacking memory activity, and wherein memory transactions are processed during the active period and not processed during the idle period; and
upon determining the counter has reached or exceeded an idle timeout threshold value before the timer has exceeded the first threshold, initiating a second self-refresh process, wherein the idle timeout threshold value corresponds to a length of the idle period, and wherein the timer and the counter are reset based on initiating the second self-refresh process.

11. The method of claim 10, further comprising resetting the timer upon initiating the second self-refresh process.

12. The method of claim 10, further comprising using a third threshold for the counter upon detecting the end of the active period and detecting the timer has exceeded the first threshold.

13. The method of claim 12, wherein the third threshold is based on a last active memory operation.

14. The method of claim 10, further comprising using a third threshold for initiating the second self-refresh process upon detecting the counter has exceeded the idle timeout threshold value and the timer has exceeded the first threshold.

15. The method of claim 10, wherein the first threshold and the idle timeout threshold value are predefined.

16. The method of claim 10, wherein the second self-refresh process includes required delays during which the memory controller is configured to not perform operations.

17. The method of claim 10, further comprising aborting the second self-refresh process upon receiving memory activity.

18. An apparatus comprising:
a memory; and
a memory controller coupled to the memory, the memory controller configured to:
activate a timer upon completing a first self-refresh process, the timer is associated with a period between self-refresh processes of the memory controller;
activate a counter upon detecting an end of an active period and the timer is below a first threshold, wherein the counter is associated with an idle period and counts a number of cycles lacking memory activity, and wherein memory transactions are processed during the active period and not processed during the idle period; and
upon determining the counter has reached or exceeded an idle timeout threshold value before the timer has exceeded the first threshold, initiate a second self-refresh process, wherein the idle timeout threshold value corresponds to a length of the idle period, and wherein the timer and the counter are reset based on initiating the second self-refresh process.

19. The apparatus of claim 18, wherein the memory comprises at least one of high bandwidth memory or double data rate (DDR) memory.

20. The apparatus of claim 18, wherein the memory controller is configured to use a third threshold for the counter for initiating the second self-refresh process upon detecting the end of the active period and the timer has exceeded the first threshold.

* * * * *